United States Patent [19]

Pressick et al.

[11] 4,246,184

[45] Jan. 20, 1981

[54] EXTRACTION OF OIL FROM VEGETABLE MATERIALS

[75] Inventors: John C. Pressick, Clarendon Hills; Robert A. Reiners, Hinsdale, both of Ill.

[73] Assignee: CPC International Inc., Englewood Cliffs, N.J.

[21] Appl. No.: 95,741

[22] Filed: Nov. 19, 1979

Related U.S. Application Data

[63] Continuation of Ser. No. 945,264, Sep. 25, 1978, abandoned.

[51] Int. Cl.[3] .......................... C09F 5/02; C11B 1/10

[52] U.S. Cl. .......................... 260/412.4; 260/412.8

[58] Field of Search .......................... 260/412.4, 412.2, 412.8

[56] References Cited

U.S. PATENT DOCUMENTS

| | | | |
|---|---|---|---|
| 2,645,650 | 7/1953 | Ayers | 260/412.4 |
| 3,297,731 | 1/1967 | Hale et al. | 260/412.4 |
| 3,432,529 | 3/1969 | Depmer | 260/412.4 |
| 3,786,078 | 1/1974 | Finley et al. | 260/412.4 |
| 3,939,281 | 2/1976 | Schwengers | 260/412.4 |
| 4,008,210 | 2/1977 | Steele et al. | 260/412.4 |

FOREIGN PATENT DOCUMENTS

| | | | |
|---|---|---|---|
| 763968 | 7/1967 | Canada | 260/412.4 |

*Primary Examiner*—John F. Niebling

*Attorney, Agent, or Firm*—Stanley M. Parmerter

[57] ABSTRACT

An improved method for removing oil from oil-bearing vegetable material is disclosed. The method comprises comminuting the vegetable material, forming agglomerates of the finely divided material containing between about 20% and about 55% water by weight, drying the agglomerates to a moisture content of less than about 15% by weight and then extracting the dried agglomerates with an oil solvent.

8 Claims, No Drawings

EXTRACTION OF OIL FROM VEGETABLE MATERIALS

This is a continuation of copending application Ser. No. 945,264, filed Sept. 25, 1978, now abandoned.

BACKGROUND OF THE INVENTION

There are numerous known methods for extracting oil from vegetable materials. One techique in commercial use, for example, involves continuously pressing the vegetable material at low moisture content to expel oil. A pretreatment steaming of the vegetable material is frequently employed to facilitate the pressing operation. In addition, it is common to employ a subsidiary step of solvent extracting the pressed material to remove residual oil.

Unfortunately, these processes possess a number of drawbacks. In particular, the expelling operation requires heavy machinery and results in a substantial rise in temperature harmful to oil and vegetable protein qualities and further tends to produce large quantities of vegetable fines which must be separated from the expelled oil.

Other techniques designed to circumvent these drawbacks have been found. These include the processes set forth in Canadian Pat. No. 763,968 and U.S. Pat. No. 3,786,078. Both of these patented processes involve direct extraction of the vegetable material with an oil solvent. Because of their respective requirements of severe operating conditions, extraction of finely divided material and/or complex pretreatments of the oil-bearing vegetable material, however, they have not proven altogether successful.

It is therefore an object of this invention to provide a simplified process for recovery of oil from vegetable materials.

It is a further object to provide an oil extraction process which does not require subjection of the oil or vegetable material to deleterious conditions of operation.

It is a still further object to provide a process which permits essentially complete recovery of oil from a variety of vegetable materials.

Another object is to provide a process which does not release finely divided material into the oil solvent.

In a copending U.S. application, Ser. No. 95,743, filed Nov. 19, 1979, a process is disclosed which involves subjecting moist vegetable material to pressure sufficient to rupture the oil-containing cells without expelling the oil from them. The compressed material is dried and the oil is extracted with an oil solvent. While this procedure overcomes many of the problems associated with earlier processes, it gives material of very low bulk density which is hard to handle on a large scale and which requires bulky oil extraction equipment. It is therefore an additional object to provide a process with extractable material of comparatively high bulk density.

These and various other objectives, as are apparent from the description which follows, are achieved through the present invention.

DESCRIPTION OF THE INVENTION

The process of the present invention provides an improved method for extracting oil from oil-bearing vegetable materials. The method comprises comminuting the vegetable material, forming agglomerates of the finely divided material containing between about 20% and about 55% water by weight, drying the agglomerates to a moisture content of less than about 15% by weight and then extracting the dried agglomerates with an oil solvent.

The process of this invention can be applied to all oil-bearing vegetable materials. It is especially suitable for those materials of relatively high oil content such as decorticated sunflower seed, decorticated cottonseed, rape seed, and corn germ obtained by wet milling. This novel procedure is particularly well suited for the extraction of oil from wet-milled corn germ. Accordingly, the description which follows is largely exemplary with respect to this particular vegetable seed material.

The first step of the present process involves comminuting the oil-bearing vegetable material. This can be accomplished by any conventional means for reducing the size of particles, such as a hammer mill or other conventional mill. The particles should be of such a size that they will form agglomerates from which the oil can be readily extracted so that the residual meal after extraction contains less than about 5% oil, preferably less than 2% oil. The particles should be so finely divided that more than about 50%, preferably more than about 80%, will pass through a No. 100 U.S. Standard Sieve.

The finely divided oil-bearing material is converted to a high moisture paste by mixing with a suitable amount of water or other moistening agent. The paste should contain between about 20% and about 55%, preferably 25% to 45%, water by total weight.

It has been discovered that pastes prepared from ground, dehydrated vegetable material need not, and desirably do not need to be rehydrated to the same degree as those from undried ground material. These pastes are optimally prepared by admixture with between about 10% to 50%, most preferably 20% to 40%, of moistening agent with the dehydrated vegetable material.

The nature of the moistening agent employed to form a paste with dehydrated vegetable material is not critical. Water alone or aqueous solutions of, for example, binding agents such as starch have been successfully employed. In a preferred embodiment, however, the moistening agent is light steepwater (the unconcentrated liquor recovered from the wet milling of corn). Although it is not understood how, it has been discovered that pastes prepared with light steep-water produce agglomerates which are significantly more easily extracted with oil solvent.

Suitable pastes may be prepared from a dehydrated vegetable material such as conventional, dried corn germ. In this instance, the corn germ—which normally contains less than about 5% moisture—may most conveniently be ground in a hammer or other conventional mill, and then converted into a paste by mixing with a suitable amount of water or other moistening agent.

In an alternative embodiment, a paste may be made directly from an essentially whole, moist vegetable material such as undried, full-fat, wet-milled corn germ. This corn germ may simply be finely ground using a hammer mill, cutting mill or other conventional apparatus. Its normal moisture content—usually about 55% by weight—may suffice to give a paste suitable for forming into agglomerates.

These two approaches may also be combined where both starting materials are available. One may, for example, grind the dried and undried wet-milled corn germ separately. The two may then be combined to form a paste. The addition of little or no moistening agent is then needed to obtain the desired moisture content. Alternatively, one may mix undried and dried wet-milled corn germ and grind them together.

Regardless of how the paste is formed, it is necessary to recognize that some of the moisture present in the vegetable material before communition will probably be lost due to the heat generated during grinding or otherwise finely dividing the vegetable starting material. It is important that the paste contain between about 20% and about 55% water by weight when the agglomerates are formed.

After an appropriate paste has been obtained, it is converted into compressed agglomerates of the finely-divided material, the agglomerates containing between about 20% and about 55% water by weight, in as much as little or no moisture is lost during the agglomeration step. Agglomeration may be accomplished using extruders, granulators or tumbling agglomerates. The size of the agglomerates is not critical. It is only important that the vegetable material be findly ground before the agglomeration step. One advantage of these agglomerates is their high bulk density. It is at least about 0.5 gram per cubic centimeter. This permits the use of a smaller solvent extractor for a given weight of vegetable material and facilitates handling of the product.

The agglomerates are dried to a moisture content of less than 15% by weight, preferably less than 6%. Conventional dryers, such as ovens and belt dryers, may be used for this drying step.

The conditions of operation may be selected so that comminution and agglomeration are preformed in the same equipment. For example, when undried, wet-milled corn germ is ground in a mill fitted with a suitable exit screen, the material is finely ground, a paste is formed, and the paste is extruded from the mill as moist, agglomerated particles.

The extraction of the dry agglomerates of oil-bearing vegetable material may be performed with any of the conventional oil solvents. Typically, however, the solvent is a liquid hydrocarbon such as hexane.

The mode and apparatus utilized for extraction may likewise be selected from among those conventional in the art. Counter-current, column, or percolation extractors may be operated in either batch or continuous manner, as desired.

After extraction has been completed, the agglomerates of vegetable material will generally exhibit an oil content of less than 5%, preferably less than about 2%, by weight. This material, which has a high protein content, may be freed of solvent by evaporation and used as animal feed or the like.

The oil is separated from the solvent using conventional equipment. The oil may be further treated as desired using any one, or a combination, of the customary steps of refining, bleaching and deodorizing to produce a high grade vegetable oil.

Previous processes which have employed extraction of oil from finely ground vegetable material have been costly. The finely divided material has so impeded the flow of solvent through the solid that extraction was very slow. In addition, the extract has been contaminated by the accumulation of very small particles of about one micron diameter. It has been very difficult and costly to remove these contaminants from the extract.

We have discovered that the present process overcomes these problems. Although the mechanism by which this process achieves the desired result is uncertain, it is observed that there is little if any accumulation of the small particles in the extract. The agglomerates extract readily and any particles that do pass into the extract are large enough to permit easy removal by settling or filtration. Furthermore, the agglomerates have sufficiently high cohesion and bulk density so that they can be handled readily on a large scale and do not require excessively bulky oil extraction equipment.

Although the foregoing process has been described chiefly in terms of a complete process for extracting the oil from essentially naturally occurring forms of vegetable materials, it is not so limited. This process may be used in combination with other conventional steps in oil extraction and by-product recovery.

Throughout the present process and any preliminary steps of treatment of the vegetable material, it is preferred that conditions deleterious to oil in the vegetable material be minimized or avoided. Of these conditions, elevated temperatures are the most serious. Such temperatures—unless for a very brief time—can cause the quality of the oil to suffer.

In view of the foregoing, it is generally desirable, where possible, to maintain moderate temperatures and inert atmospheres through the processing of the vegetable material and its oil. Additionally, particular precautions are preferably taken during such steps as the grinding of wet or whole vegetable material to a paste. For example, the grinding mill is desirably maintained below 30° C. to remove heat generated during such a step (even temperatures of below 0° C. may be employed because freezing appears only to improve the fineness of the grind).

The following examples illustrate certain embodiments of the present invention. Unless otherwise stated, all proportions are provided on the basis of weight.

EXAMPLE I

Dried, full-fat corn germ (moisture content, 3%) was ground in a 12.7 cm diameter Micropulverizer type SH stainless steel hammer mill made by Pulverizing Machinery Company, Summit, N.J. The mill was operated at 8800 rpm. The germ was ground in a single pass with a 6.4 mm or a 1.6 mm screen in the mill. The resultant finely divided vegetable material was then mixed with moistening agent which was virtually instantly absorbed to produce a paste.

The moist paste of finely divided corn germ was pushed through a screen to produce agglomerates and the agglomerates were dried in an air oven maintained at 110° C. The resultant dried agglomerates had a moisture content of between 1 and 2%, were essentially cylindrical and ranged in weight from about 0.01 to 0.15 gram.

The dried agglomerates were extracted with hot hexane as described in J. Am. Oil Chemists Soc. 26, 422 (1949). A Butt type extractor was used with a reflux rate of about 18 ml per minute. Residual oil was determined by the Spex mill method. In this method, the sample is placed with carbon tetrachloride in a small ball mill (Spex mixer mill, Catalog No. 8000) made by Spex Industries, Inc., Metuchen, N.J., and shaken to thoroughly disintegrate the meal. The ground slurry is heated for 30 minutes under reflux with carbon tetrachloride and filtered. The oil content of the filtrate is determined after evaporation of the solvent.

The results are given in Table I. They indicate that for good oil extraction it is preferable to grind the germ with a 1.6 mm screen in the mill. The size of the agglomerates is not critical.

TABLE I

| Mill Screen Size (mm) | Moisture in Paste (%) | Paste Moistening Agent | Agglomerate[(1)] Diameter (mm) | Residual Oil in Agglomerates (%) Extraction Time (Min) 10 | 45 | 90 |
|---|---|---|---|---|---|---|
| 6.4 | 20 | Steepwater | 1.65 | — | — | 2.8 |
| 6.4 | 30 | Steepwater | 1.65 | — | — | 3.2 |
| 6.4 | 40 | Steepwater | 1.65 | 5.7 | 4.2 | 3.6 |
| 6.4 | 40 | Distilled Water | 1.65 | 6.9 | 5.1 | 4.4 |
| 1.6 | 40 | Steepwater | 1.65 | 3.7 | 2.4 | 2.0 |
| 1.6 | 40 | Steepwater | 2.82 | 3.7 | 2.5 | 2.0 |
| 1.6 | 40 | Steepwater | 4.78 | 4.0 | 2.6 | 2.1 |
| 1.6 | 40 | Steepwater | 5.66 | 4.0 | 2.6 | 1.9 |

(1)Agglomerates were about 3 to 6 mm in length.

EXAMPLE II

Dried corn germ was ground, agglomerated and then extracted generally as set forth in Example I. A 6.4 mm screen was used in the hammer mill. 40% by weight of steep-water moistening agent, and a 10 mesh extrusion screen were used. In the pre-extraction drying of the agglomerates, different times were employed to yield different moisture contents. The results of subsequent extraction are given in Table II.

These results show that the degree of oil extraction, as indicated by residual oil content, varies only slightly as pre-extraction moisture is varied from 0.63% to 12.5%. The pellets do not disintegrate even when they contain as much as 17.4% moisture after extraction.

TABLE II

| Moisture Content of the Agglomerates: Pre-Extraction (%) | Post Extraction (%) | Residual Oil (%) in the Agglomerates Extraction Time (Min) 10 | 45 | 90 |
|---|---|---|---|---|
| 0.63 | 0.95 | 5.0 | 3.4 | 2.8 |
| 4.5 | 4.5 | 5.3 | 3.8 | 3.3 |
| 7.2 | 9.1 | 5.7 | 3.9 | 3.2 |
| 12.5 | 17.4 | 6.5 | 4.2 | 3.4 |

EXAMPLE III

Samples of wet (53% moisture) and dry (3.3% moisture) corn germ were ground in a hammer mill operating at 8800 rpm to determine the effect of their particle sizes on extraction of the subsequent agglomerates. After particularization to a degree indicated by the designated retaining exit screens on the mill, agglomerates were formed, oven dried and oil extracted. The dry ground germ was hydrated to 40% moisture with light steepwater before agglomeration. No moisture was added to the wet ground corn germ prior to agglomeration. Agglomerated samples were dried and extracted with hexane for 90 minutes following the usual procedure before residual oil was determined.

The results are shown in Table III. They reflect the importance of the fineness of the initial grind on the extractability of resultant agglomerates. This relationship is most readily apparent from comparison of residual oil contents with the mean or 50% particle size in the grind.

TABLE III

| Sample Source | Mill Screen Size (mm) | 50% Particle Size[(2)] (mm) | Particle Size Spectrum[(3)] % on U.S. Standard Screen Sizes: 18 | 25 | 35 | 45 | 70 | 100 | 200 | 270 | 325 | Fines Pan | Residual Oil In Agglomerates (%) |
|---|---|---|---|---|---|---|---|---|---|---|---|---|---|
| Dry Germ | 6.4 | 0.113 | 2.2 | 5.6 | 8.2 | 10.2 | 12.9 | 8.5 | 12.3 | 3.7 | 0.9 | 35.5 | 2.9 |
| Dry Germ | 3.2 | 0.055 | 0.5 | 1.7 | 3.6 | 5.4 | 11.1 | 8.1 | 13.5 | 6.2 | 1.3 | 47.9 | 1.5 |
| Dry Germ | 1.6 | 0.030 | 0.3 | 0.4 | 1.0 | 2.4 | 7.5 | 6.3 | 11.8 | 6.1 | 2.9 | 61.2 | 0.8 |
| Wet Germ | 3.2 | 0.240 | 9.0 | 11.1 | 9.6 | 10.8 | 12.2 | 5.0 | 12.4 | 8.3 | 0.6 | 21.1 | 4.6 |
| Wet Germ | 1.6[(1)] | 0.100 | 0.5 | 0.3 | 6.6 | 9.2 | 10.9 | 8.3 | 27.8 | 10.1 | 3.1 | 23.4 | 1.3 |

(1)Sample was first ground using a 3.2 mm screen and then a 1.6 mm screen while cooling with dry ice to avoid excessive heating.
(2)This is the screen opening required to pass 50% by weight of the grind on a non-fat, dry basis. These data were obtained from cumulative plots.
(3)Dry ground germ was screened in hexane. Wet ground germ was screened in acetone.

EXAMPLE IV

Samples of wet (about 50% moisture) and dry (2.6% moisture) corn germ were ground through an Urschel Laboratories Model 1700 COMITROL mill made by the Urschel Laboratories Company, Valpariso, Indiana, using various heads on the mill. The dry ground germ was hydrated to 40% moisture with light steepwater before agglomeration. The pastes were passed through a COLTON No. 561 rotary wet granulator made by the Arthur Colton Company, Detroit, Mich., fitted with a 1.6 mm screen and operating at 34 rpm. The particulate matter was dried in a circulating air oven at 50° C. to 2 to 3% moisture and extracted with hexane in the usual manner.

The results are given in Table IV. They show that a cutting mill is suitable for comminuting the vegetable material. A microcut head (2M-160085-5) gives a finely divided product that can be hydrated, agglomerated and dried to give a product from which the oil is readily extracted. An ordinary cutting head (2K-030060) is less satisfactory.

TABLE IV

| Sample Source | COMITROL Head | Particles Retained[(1)] (Weight %) On U.S. Screen No. 100 | Oil in Residue (%) Extraction Time (Min) 10 | 45 | 90 |
|---|---|---|---|---|---|
| Dry Germ | 2K-030060 | 72.2[(2)] | 21.6 | 13.8 | 10.9 |
| Dry Germ | 2M-160085-5 | 19.7 | 3.6 | 2.3 | 2.0 |
| Wet Germ | 2M-180084-2 | 55.5 | 10.2 | 5.0 | 4.2 |

(1)Dry ground germ was screened in hexane; wet ground germ was screened in water.
(2)Particles were so large they were not agglomerated before oil extraction.

We claim:

1. A process for the extraction of oil from oil-bearing vegetable material comprising the steps of:

(a) providing moistened comminuted vegetable material containing between about 25% and about 55% water by weight;

(b) forming agglomerates of said moistened comminuted vegetable material by pushing it through a screen;

(c) drying said agglomerates to a moisture content of less than about 15% by weight; and (d) extracting the dried agglomerates with an oil solvent.

2. The process of claim 1, wherein the vegetable material is simultaneously comminuted and converted into agglomerates.

3. The process of claim 1, wherein at least about 50% of the comminuted material will pass through a No. 100 U.S. Standard Sieve.

4. The process of claim 1, wherein the dried agglomerates have a bulk density of at least about 0.5 gram per cubic centimeter.

5. The process of claim 1, wherein the vegetable material is essentially whole undried corn germ obtained by the wet-milling of corn.

6. The process of claim 1, wherein the vegetable material is dry corn germ and the agglomerates are formed after hydrating said germ with a moistening agent.

7. The process of claim 6, wherein the moistening agent is light steepwater.

8. The process of claim 1, wherein the oil solvent is hexane.

* * * * *